April 16, 1957 J. W. SOFFER 2,788,924
BEADED-STEM DISPENSING VALVE FOR GAS-PRESSURE CONTAINERS
Filed July 2, 1953

*INVENTOR.*
JACK W. SOFFER
BY
*Jerome A. Gross*
ATTORNEY

United States Patent Office 2,788,924
Patented Apr. 16, 1957

2,788,924

BEADED-STEM DISPENSING VALVE FOR GAS-PRESSURE CONTAINERS

Jack W. Soffer, St. Louis, Mo., assignor to Development Research, Inc., St. Louis, Mo., a corporation of Missouri Application July 2, 1953, Serial No. 365,675

9 Claims. (Cl. 222—394)

This invention relates to improvements in dispensing valves for gas-pressure containers, such as are used to dispense products such as foods and shaving lathers in gas-fluffed condition, and specifically valves having tubular discharge stems and adapted to be opened by tilting in a resilient member or grommet.

The objects of the present invention are:

To provide a dispensing valve which does not leak, regardless of the degree of tilt to which the stem is subjected; to effect better control of the dispensing action and dispensing speed; and to achieve these purposes without departing from a simple form of dispensing valve which enjoys wide popular acceptance.

For the achievement of these purposes, a novel structure is employed having annular beads on the outer surface of the dispensing valve stem within the surrounding resilient sealing member, one bead within and the other outside of the aperture in the top wall of the container. This structure functions in two ways to better the action of the valve, namely: it so confines the resilient sleeve as to achieve a fluid-like flow of the material thereof within the aperture during tilting, to avoid leakage; and it provides for better rotational movement and less translational movement of the valve stem on tilting thereof, to effect gradual, positive opening of the valve.

The present invention was developed in response to needs of users for a valve which dispensed fluffed fluids more slowly and with better control than was possible with valves theretofore available. The obvious, but unsuccessful, trend of effort was to restrict the aperture of the valve stem; and this resulted in leakage of the fluids so dispensed around the outer side of the valve stem past the end of the grommet sleeve. It appeared that such leakage resulted in part from the restriction of the flow due to the use of the smaller aperture, and in part from grommet distortion accompanying the slightly greater degree of tilt which the user tended to give to the valve stem when the flow was so slowed.

Inasmuch as it was not possible to solve the problem by making the grommet fit more tightly around the valve stem throughout the entire space where the stem is gripped by the grommet, there was no apparent way to accomplish the desired results.

In the present invention, there is some analogy to the use of automotive pistons and piston-rings. It not being feasible to effect a close fit over the entire outside cylindrical surface of a piston, close fit is obtained only along narrow bands of the area. Obviously, it would not be practical to introduce expanding piston rings onto the stem of a valve such as that used in throw-away dispensers. However, I have discovered that the essentially fluid qualities of the rubber or other resilient material used as grommets makes such expansible piston rings unnecessary, and that fixed external beads function in much the same way.

Further functiones of the fixed beads arise from the fact that they are located in such manner as to flank the outer and inner sides of the container aperture through which the valve stem passes; hence on rocking of the stems they cause the rubber or other resilient material of the grommet to flow fluid-like away from the portions of the container aperture which the bead portions approach, and to fill the aperture portions which are enlarged by tilting of the valve stem and, save for such pressure on the other portions, might be left unsealed.

The construction and functioning of the present invention is illustrated in the accompanying drawings (one page) in which.

Figure 1:
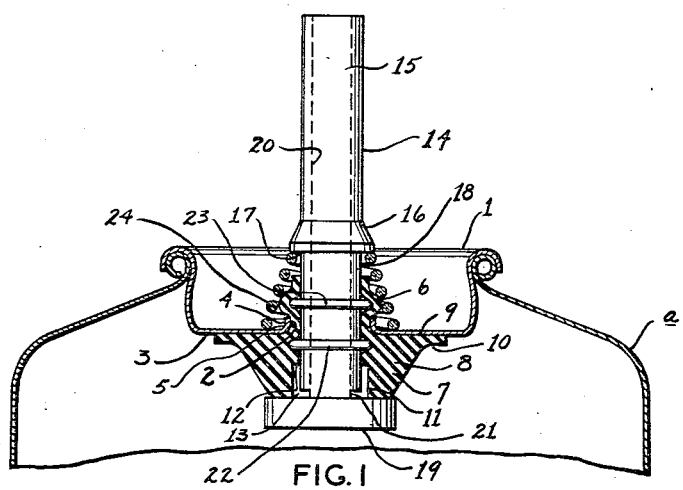
Figure 1 represents a side elevational view of the valve stem of the present invention, with all other elements of such valve shown in section.

To a pressure container of the throw-away type $a$ is sealedly attached a top portion or "mounting cup" 1 having a central circular aperture 2 in its top wall 3, the aperture being formed with an upturned aperture flange 4 substantially perpendicular to the top wall 3 and joined thereto by a radius portion 5. Penetrating the aperture 2 and adapted for close sealing engagement against the inner surface of the aperture flange 4 is the tubular sleeve portion 6 of a resilient sealing member or grommet generally designated 7, formed preferably of synthetic rubber or other resilient sealing material possessing substantially similar flow characteristics. Considering the manner of operation of the invention, the use of material having almost fluid flow characteristics (rubber having a Poisson's ratio of 1.0) is important for assuring optimum sealing characteristics.

At the lower end of the tubular sleeve portion 6 is an enlarged body portion 8 having an enlarged sealing face 9 adapted to be pressed sealingly against the inner surface of the top wall 3. The face 9 is surrounded by a tapering, flexible, unsecured peripheral edge 10. The body portion 8 further has an annular valve seat portion 11 facing away from the top wall 3 of the container and axially aligned with the sleeve when the valve member 14, hereafter described, is not tilted. The body portion 8 of the sealing member has a bore 12 of the same diameter as the inner diameter of the sleeve portion, save at the valve seat portion the bore is enlarged to provide an annular passage 13 about the valve member 14 in the region of its ports, as hereafter described.

The valve member generally designated 14 is preferably formed of a rigid plastic by injection molding. It comprises a tubular dispensing tip portion 15 having a flared outer wall 16 terminating in an inward-presented annular shoulder 17, a cylindrical tube portion 18 penetrating the sleeve 6 and bore 12 of the sealing member 7, and a valve head 19 at its inner end and closing the tube's central passage 20. The contents of the container $a$ move into such central passage 20 only through one of the oppositely disposed small lateral ports 21 which penetrate the tube portion 18 immediately adjacent the valve head 19.

The outer wall of the cylindrical tube portion 18 has two integrally formed annular beads, an inner bead 22 and an outer bead 23. These are so spaced on the outer surface of the cylindrical tube portion 18 that when the valve head 19 is in position against the valve seat portion 11 of the sealing member 7, the inner bead 22 will serve to distend slightly the bore 12 just adjacent the base of the sleeve portion 6, the position of the inner bead 22 being such that it is separated from the radius portion 5 at the base of the container aperture flange 4 by a thickness approximately equal to the thickness of the sealing sleeve portion 6. Simultaneously, the outer bead 23 will be at a level raised above the upper margin of the aperture flange 4 a distance approximately equal to the thickness of the sleeve portion 6.

The inner diameter of the sleeve portion 6 and the bore 12 is such as to assure a snug sealing fit over the cylindrical stem surface 18 and inside the aperture flange 4 particularly when the valve is closed, as shown in Figure 1. This snugness is augmented by distending the resilient grommet material over the beads 22, 23. With elastic materials, the application of a tensile force results in compression stresses at 90° thereto. Thus, the distending of the resilient material by parallel beads results in flowing of material between the beads under compressive force.

The increase in sealing effectiveness due to this construction will be immediately apparent, especially on tilting or rocking the valve member 14 attendant to opening the valve. This is illustrated by contrasting the shape of the sealing member 7 when the valve is closed, as in Figure 1, with its shape when the valve is open, as in Figure 2.

Tilting the valve member 14 by lateral force applied outward of the shoulder 17 results in a rocking, substantially without translational movement, about a center approximately midway between the inner bead 22 and the outer bead 23. From Figure 2 it is apparent that the lower juncture of down-tilted portion of the outer bead 23 and the cylindrical stem surface 18 will nearly come into contact with the upper margin of the aperture flange 4, driving much of the adjacent material in the sleeve portion 6 downward. The projecting upper surface of the inner bead 22 serves to restrict this downward flow, so that there will be no open space adjacent the cylindrical surface 18 on the down-tilted side. Similarly, on the uptilted side (shown in the drawings on the right) the inner bead 22 will press upward and nest closely adjacent the radius 5 of the top wall 3, driving part of the resilient grommet material upward and assuring a tight seal on that side. The fit of the inner bead 22 within the radius 5 also serves to restrict the valve member 14 from sideward movement.

A helical spring 24, inserted between the stem shoulder 17 and the container top portion 3, holds the valve member 14 normally closed, with the valve head 19 sealed against the seat portion 11. When the valve member 14 is tilted, as in Figure 2, the spring 24 provides a yielding resistance, aiding in control of the degree of opening, and also serves to restore the valve member 14 to closed position.

Figure 3:
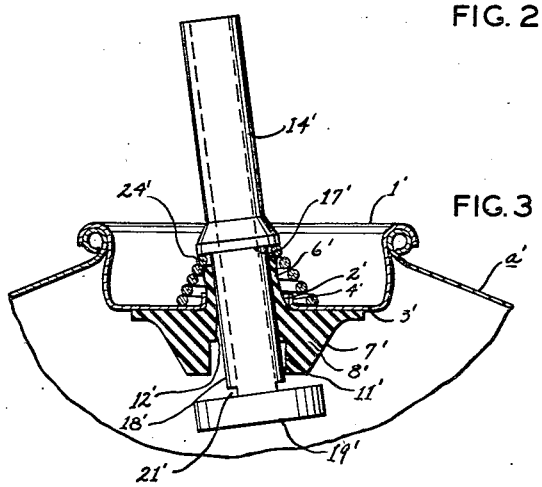
Figure 3 is a contrasting view of a previous type of valve in position similar to that of Figure 2.

In order that the functioning of the improvements herein described be thoroughly understood, the present structure may be contrasted in its operation with that of a similar valve without the beads 22, 23. Such a valve is shown in Figure 3 in position on a container a'. It comprises a similar mounting cup 1' with a top wall 3' having an aperture 2' with an upturned aperture flange 4', and a likewise similar sealing member 7' including a tubular sleeve portion 6' and a body portion 8' having a bore 12' of the same inner diameter as the sleeve portion 6', of which it is essentially a continuation. The valve member 14' has a cylindrical stem portion 18' whose outer surface has no beads; and outward of this cylindrical tube portion 18' is an inward-facing shoulder 17' against which the outer end of a helical spring 24' abuts, its inner end abutting against the container top wall 3'.

Figure 2:
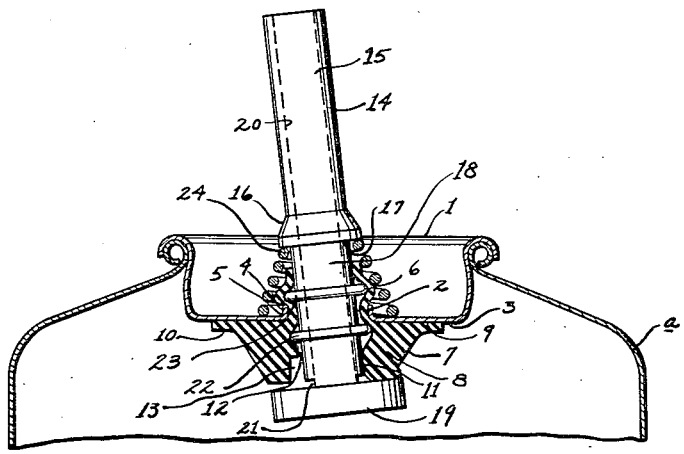
Figure 2 is a view similar to Figure 1 showing the valve stem tilted to open position.

In the absence of any outer bead such as the bead 23 of Figures 1 and 2, when the form of valve shown in Figure 3 is tilted the cylindrical tube portion 18' tends to slide inward through the sleeve portion 6', while the valve head 19' tends to slide sideward across the valve seat portion 11' in a direction opposite the direction of tilt. This inward and translational movement makes the valve open more suddenly. When it opens, the pressure of the container contents is exerted against a gap-like opening between the cylindrical surface 18' and the grommet bore 12'. At the same time, the tilting removes the pressure of the upper margin of the aperture flange 4' on the opposite side. This gives rise to the possibility of leakage. If the valve member 14' is provided with small ports 21' in an effort to achieve slow flow, their restrictive effect will increase this possibility of leakage. But the construction shown in Figures 1 and 2 successfully avoids this possibility.

The valve structure here shown may be used with a variety of products other than fluffed products, as for example, with products to be atomized, sprayed, or otherwise discharged under gas pressure.

Other embodiments of the invention features hereof will be apparent to those familiar with the problems of valve construction; and this invention should be considered as co-extensive with the claims hereof.

In the claims, the terms "seal" and "sealing" refer to preventing the passage of fluid or gas, and do not necessarily imply restriction of relative mechanical movement.

What I claim is:

1. A rockable tubular dispensing valve member adapted for mounting within a resilient sleeve within an aperture in a gas-pressure container, comprising a tubular stem member having a valve head portion closing its inner end, a discharge spout opening at its outer end, a lateral port adjacent the valve head and adapted to permit communication with the stem portion when the valve head portion is displaced from closed position, further having an outer cylindrical surface axially outward of said lateral port extending a width greater than the depth of the aperture of such container, and adapted to be sealedly encompassed by such sleeve at the level it passes through such aperture and an annular bead extending radially from said surface at a point outward of such lateral port and inward of such aperture and adapted to distend such resilient sleeve adjacent the inner side of container aperture and seal such resilient sleeve thereagainst despite relative rocking movement of said valve member, together with a second annular bead spaced outwardly along such outer cylindrical surface axially outward from said first annular bead a distance greater than the thickness of the container aperture and adapted to distend such resilient sleeve adjacent the outer side of the container aperture and seal such resilient sleeve thereagainst.

2. A tubular dispensing valve member as defined in claim 1, the outer surface thereof being cylindrical in the region of its mounting in the aperture, and the aperture being circular.

3. A tubular dispensing valve member as defined in claim 1, the said annular beads being integral with the dispensing valve member.

4. A dispensing valve for gas-pressure containers comprising a container top portion having a circular aperture therethrough, a sealing sleeve formed of resilient material extending through said aperture in close sealing engagement with the circular margin thereof and having an enlarged body portion with an annular valve seat faced away from such container top portion, and a rockable tubular dispensing valve member mounted within said sleeve having a pair of annular beads, one at a level inwardly of said aperture and the other at a level outwardly thereof whereby to distend the sleeve and maintain tight sealing engagement thereof regardless of tilt of the valve member.

5. A dispensing valve for gas-pressure containers as defined in claim 4, the circular aperture in the container top portion having a flange extending outward substantially perpendicular to the surface of said portion.

6. A dispensing valve for gas-pressure containers as defined in claim 4, the circular aperture in the container top portion having an outwardly-extending flange whose outer margin serves as the outer side of the container aperture.

7. A dispensing valve for gas-pressure containers as defined in claim 6, the juncture of the top portion and the flange being formed to a radius wherein the upturned portion of the first annular bead nests and is confined on tilting of the valve stem and whereby translational movement of the stem is restricted.

8. A dispensing valve as defined in claim 4, the said beads and aperture sides confining the flow of material comprising such resilient sleeve and sealing the space between the cylindrical surface and the aperture.

9. A dispensing valve as defined in claim 4, the container aperture being located approximately midway between the beads, whereby rocking of the valve member is centered approximately at the middle of the aperture and translational movement of the valve member is avoided.

References Cited in the file of this patent

UNITED STATES PATENTS

| | | |
|---|---|---|
| 576,702 | True | Feb. 9, 1897 |
| 2,185,741 | Sorg et al. | Jan. 2, 1940 |
| 2,615,597 | Tomasek et al. | Oct. 28, 1952 |
| 2,703,665 | Soffer et al. | Mar. 8, 1955 |
| 2,704,621 | Soffer | Mar. 22, 1955 |
| 2,704,622 | Soffer | Mar. 22, 1955 |